Patented Feb. 16, 1932

1,845,404

UNITED STATES PATENT OFFICE

HERMANN DÜRR AND WILHELM SCHNEIDER, OF DESSAU-IN-ANHALT, GERMANY, ASSIGNORS TO AGFA ANSCO CORPORATION, OF BINGHAMTON, NEW YORK, A CORPORATION OF NEW YORK

BACKING OF PHOTOGRAPHIC MATERIALS TO PREVENT HALATION

No Drawing. Application filed December 31, 1930, Serial No. 505,977, and in Germany February 17, 1930.

Our present invention relates to the photographic art and more particularly to a new backing of photographic materials to prevent halation.

One of its objects is to provide on photographic plates or films an anti-halation layer in which a dye or a mixture of dyes is incorporated being completely destroyed in the developing and fixing baths.

We have found that the condensation products obtainable from a substituted aromatic aldehyde and a quaternary heterocyclic base containing a reactive methyl group, are eminently suited for the preparation of anti-halation layers capable of being irreversibly decolorized in the photographic developing solutions. These condensation products corresponding to the general formula

wherein R means a quaternary heterocyclic base and A means an aromatic hydrocarbon substituted by OH, alkyl, alkoxy, $N\diagdown_{alkyl}^{alkyl}$, halogen or $-SO_3H$.

The anti-halation layers are prepared in the usual manner. They may have any thickness and at the same time serve as a back coating of films to prevent curling. Light diffusing agents may also be added to the new anti-halation layers, for instance, for attaining a back coating suitable for retouching according to U. S. Specification No. 1,631,421. The dyes may, if required, also directly be applied on the photographic layer support without a special binding agent being used. Several dyes of the group may be mixed together. It is, likewise, possible to add dyes of other groups, for instance, aurine.

The following dyes are mentioned by way of example:

*Example 1.*—The red condensation product from quinaldine-bromethylate and para-dimethylaminobenzaldehyde having the formula:

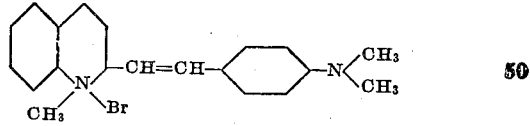

*Example 2.*—The red condensation product from methylbenzthiazol-chloro-methylate and para-dimethylaminobenzaldehyde of the formula:

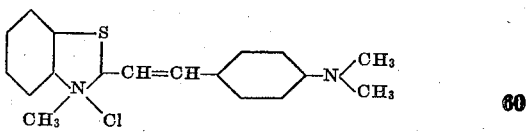

*Example 3.*—The yellow condensation product from quinaldine-methylsulfate and piperonal:

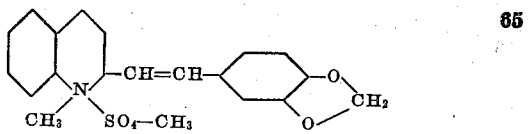

*Example 4.*—The yellow condensation product from quinaldine-methylsulfate and veratric aldehyde:

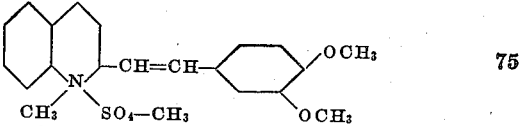

*Example 5.*—The yellow condensation product from quinaldine-methylsulfate and anisaldehyde:

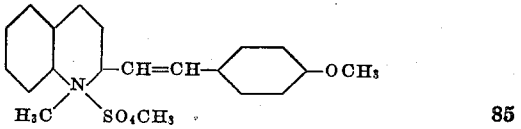

The condensation products mentioned in the foregoing examples are obtainable by melting together equivalent amounts of the reaction components in the absence of diluents. They are likewise obtainable by heating the reaction components on the water bath under reflux in the presence of a diluent, such as methanol, ethanol, acetic anhydride, pyridine and so on. The condensation may be accelerated by addition of a condensing agent, such as, for instance, piperidine which is useful, for instance, when carrying out the condensation in the presence of ethanol pyridine.

Our invention is not limited to the condensation products mentioned in the foregoing examples. Other dyes of the group characterized above, may be used. As substituted aromatic aldehydes being one component of the condensation products, we enumerate, for instance, hydroxy-, alkyl-, alkoxy-, dialkylamino-, halogen- and sulfo aldehydes. The quaternary heterocyclic base containing a reactive methyl group, on the other hand, may be a derivative of the pyridine-, thiazol-, quinoline-, benzthiazol-, benzselenazol-, benzoxazol-, naphthoquinoline-, naphthothiazol-, naphthoselenazol-, naphthoxazol series.

A mixture suitable according to this invention for preparing anti-halation layers is, for instance, obtainable by adding to 1 kilo of a gelatin solution of 10 per cent strength ready for coating 0.4 gram of the dye mentioned under No. 1 and 0.3 gram of the dye mentioned under No. 4.

The yellow dyes may be used in anti-halation layers for the ordinary silver bromide emulsion layers, mixtures of yellow and red dyes for emulsion layers sensitized for the yellow and yellowish green light rays, mixtures of yellow and other, for instance, blue dyes, may be used for panchromatically sensitized emulsion layers.

What we claim is:—

1. Photographic materials provided with an anti-halation layer dyed with a condensation product of a substituted aromatc aldehyde with a quaternary heterocyclic base carrying a methyl group capable of reacting.

2. Photographic materials provided with an anti-halation layer dyed with a dye corresponding to the general formula

R—C=C—A wherein R means a quaternary heterocyclic base and A means an aromatic hydrocarbon substituted by a substituent of the group consisting of OH, alkyl, alkoxy, N$<_{\text{alkyl}}^{\text{alkyl}}$, halogen, —SO$_3$H.

3. Photographic materials provided with an anti-halation layer dyed with a dye corresponding to the general formula

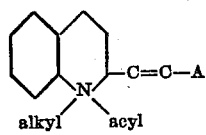

wherein A means the benzene nucleus substituted by a substituent of the group consisting of .OH, alkyl, alkoxy, N$<_{\text{alkyl}}^{\text{alkyl}}$, halogen, —SO$_3$H.

4. Photographic materials provided with an anti-halation layer dyed with a dye corresponding to the formula

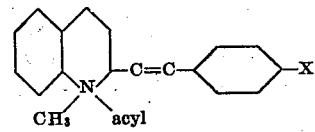

wherein X means a substituent of the group consisting of

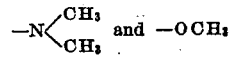

5. Photographic materials provided with an anti-halation layer dyed with a dye corresponding to the formula

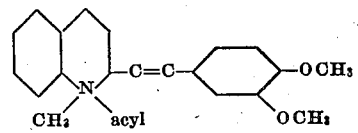

6. Photographic materials provided with an anti-halation layer dyed with a dye corresponding to the formula

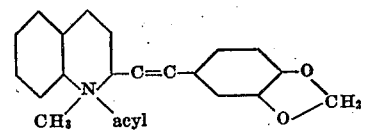

In testimony whereof, we affix our signatures.

HERMANN DÜRR.
WILHELM SCHNEIDER.